United States Patent
Jonas et al.

(10) Patent No.: US 6,201,650 B1
(45) Date of Patent: Mar. 13, 2001

(54) CYLINDRICAL MOUNT FOR ADJUSTABLE OPTICAL COMPONENTS

(75) Inventors: Richard Jonas; Horst Guth, both of Wetzler (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 09/630,554

(22) Filed: Aug. 1, 2000

Related U.S. Application Data

(63) Continuation of application No. PCT/DE99/00163, filed on Jan. 23, 1999.

(30) Foreign Application Priority Data

Feb. 5, 1998 (DE) .............................................. 198 04 471

(51) Int. Cl.⁷ ............................ G02B 7/02; G02B 151/14
(52) U.S. Cl. ......................... 359/819; 359/823; 359/699; 359/694
(58) Field of Search ................................. 359/685, 694, 359/699, 700, 819, 822, 823

(56) References Cited

U.S. PATENT DOCUMENTS

| | | | |
|---|---|---|---|
| 3,112,627 | * 12/1963 | Gissel | 464/162 |
| 3,951,522 | 4/1976 | Hashimoto | 359/694 |
| 5,493,452 | * 2/1996 | Hoshino et al. | 359/819 |
| 5,717,528 | * 2/1998 | Ihara et al. | 359/694 |
| 5,847,886 | * 12/1998 | Spedding et al. | 359/819 |
| 5,896,234 | * 4/1999 | Miyamoto et al. | 359/819 |
| 6,101,046 | * 8/2000 | De Winter | 359/699 |

FOREIGN PATENT DOCUMENTS 1 271 653    7/1960  (FR) .

OTHER PUBLICATIONS

Patent Abstracts of Japan, "Zoom Lens Driving Device and Position Detecting Method for Variator Lens Group", vol. 18, No. 321, (Jun. 17, 1994); Abstract of Takano Hiroo, JP 06–075153 (Mar. 18, 1994).

Patent Abstracts of Japan, "Moving Device of Lens", (Nov. 11, 1982); Abstract of Tokunaga Tomokazu, JP 59087414 (May 21, 1984).

* cited by examiner

*Primary Examiner*—Georgia Epps
*Assistant Examiner*—Saeed Seyrafi
(74) *Attorney, Agent, or Firm*—Foley & Lardner

(57) ABSTRACT

A cylindrical mount for adjustable optical components (2) comprises a sleeve (4) which is fixed relative to the mount and has a slot-like rectilinear guide (5), an inner variator (1) which can be displaced axially, a rotatable cam carrier (6), and at least one ball (13) as transition element between the variator (1), rectilinear guide (5) and cam carrier (6), the ball (13) being retained on the variator (1) in a radially resilient manner in a locally fixable securing means (9, 12). It is possible to adjust the local position of the securing means (9, 12) on the variator (1) in the axial and/or radial directions. The securing means provided is preferably a leaf spring (9) with a hole (12) or an indent as the ball rest.

4 Claims, 4 Drawing Sheets

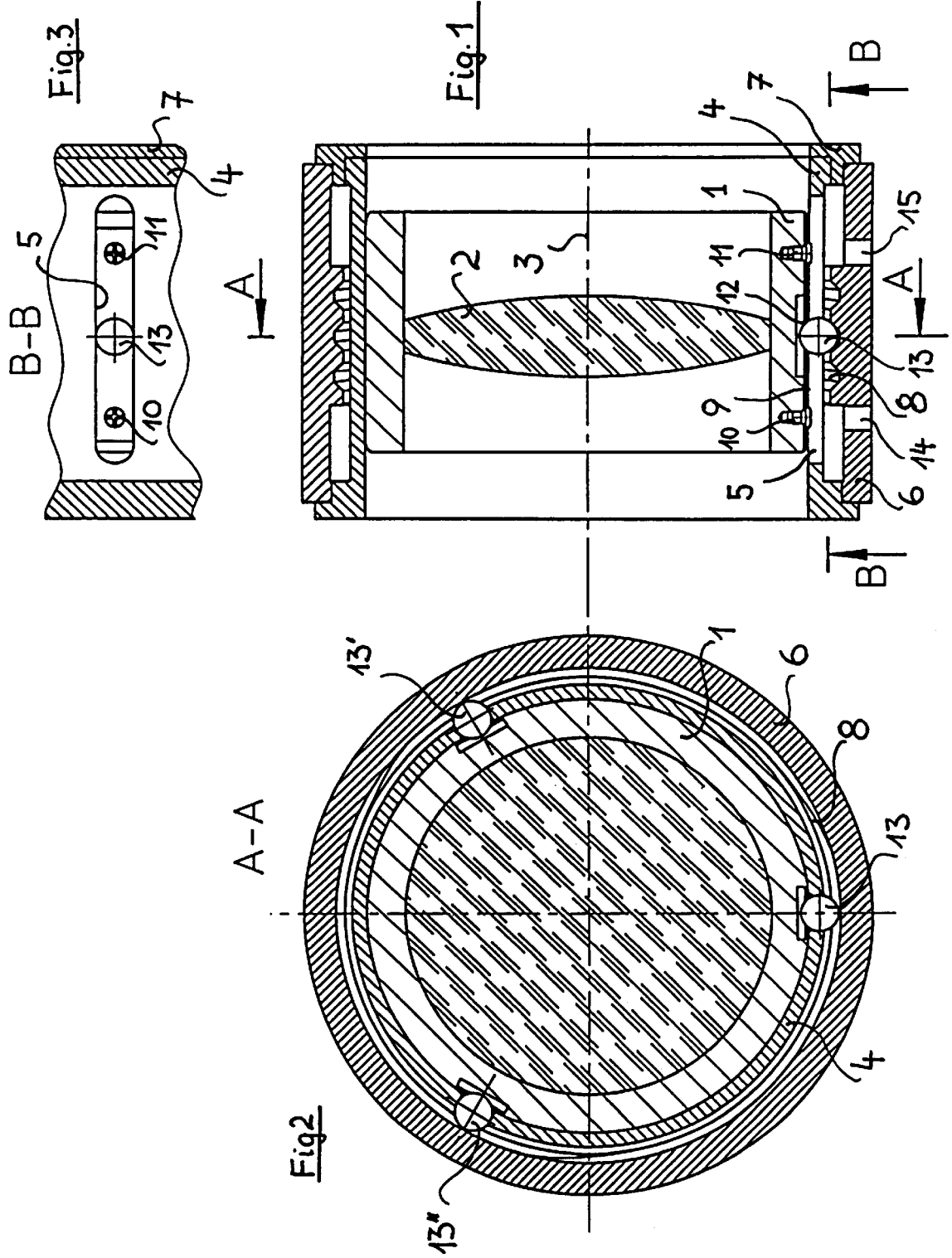

CYLINDRICAL MOUNT FOR ADJUSTABLE OPTICAL COMPONENTS

BACKGROUND OF THE INVENTION

This application is a continuation of International Application PCT/DE99/00163, filed Jan. 23, 1999 (and which designated the United States), which in turn claims priority from German application 198 04 471.2, filed Feb. 5, 1998. The entire contents of this PCT application and German application are incorporated herein by reference.

RELATED BACKGROUND ART

The invention relates to a cylindrical mount for adjustable optical components.

Mounts of this type are known, for example from U.S. Pat. No. 3,951,522, for photographic lenses in which lens elements can be displaced axially relative to other lens elements for the purpose of focussing or varying the focal length. During the displacement, rotations of the lens elements are generally to be avoided, in order to avoid the latter being affected by any centering errors which may be present.

For this purpose, the lenses have, in a fixed mount part, one or more milled reliefs which run parallel to the cylinder axis and in which there is guided in each case one block fastened on the variator (rectilinear guide). Fastened on the block is a roller which engages in a cam path milled in the cam carrier. During a rotation of the cam carrier, the variator is pushed back and forth along the cylinder axis in accordance with the cam profile.

The variator is designed as a cylinder which, by way of a suitable fit, slides in the fixed cylindrical mount part. The roller, which is guided in the cam carrier, also subjects the variator to a force component in the direction perpendicular to the cylinder axis if sliding resistances occur, this resulting in slight tilting in the cylinder guide. Said tilting is generally absorbed by the sliding properties of the cylinder surfaces and lubricants, but may also result in sluggishness or even jamming. However, tilting of the variator also means tilting of the optical components, retained in said variator, in relation to the optical axis, with the result that the image quality is also thus adversely affected.

The cam paths in the cam carrier and the roller diameter have to be coordinated very precisely with one another in order to ensure zero backlash during reverse movement. It is known from JP 59087414 for the guide path to be formed trapezoidally in a fixed mount part and the roller diameter to be selected such that it can engage in the guide path from the wider side. Zero backlash is achieved by resilient contact pressure against the trapezium flanks. The abovementioned force component in the direction perpendicular to the cylinder axis is thus enhanced and naturally also acts on the roller axis, and this may also result in sluggishness of the roller in the cam path. More serious, however, is the fact that, in the case of a plurality of guide paths, cam paths and transmission elements, assigned thereto, in a mount, product tolerances may result in redundancy of the components which are to be adapted to one another, this then resulting in sluggishness of the cylinder guide.

FR 1 271 653 discloses a mount in which an inner variator is provided, on its outer circumferential surface, with an encircling triangular groove in which three balls which are offset in relation to one another run. The variator is enclosed by a sleeve which, parallel to the optical axis, has three slots which serve as rectilinear guide paths for the balls. The sleeve is mounted rotatably on a cam carrier which is fixed relative to the mount, the balls running in cam paths which are made in the inner surface of the cam carrier. The variator is supported on the cam carrier merely via the balls and is guided and centered thereby. During a rotation of the sleeve, the variator is displaced along the optical axis of the mount by the balls following, on the one hand, in the groove on the variator, the rotation of the sleeve and, on the other hand, in the rectilinear guide path of the sleeve, the cam path in the cam carrier.

In order to ensure that the sleeve can rotate without obstruction, it is necessary to provide, between the variator and the cam carrier, sufficient space, which can also compensate for dimensional tolerances in the diameter of the balls and the depth of the guide paths. A slight offset of the variator in the direction perpendicular to the optical axis and slight tilting in relation to the optical axis cannot be avoided and can only be kept within tenable limits by high-outlay production with very narrow dimensional tolerances. In the case of sluggishness of individual balls of the variator, rotation of the variator cannot be ruled out.

SUMMARY OF THE INVENTION

The object of the invention was thus to provide a possible transmission means between the cam carrier, rectilinear guide and variator which does not have the abovementioned disadvantages, operates with zero backlash and can counteract the tilting of the optics.

This object is achieved according to the invention, in the case of a cylindrical mount of the type mentioned in the introduction, by the features of claim 1. In this case, it is possible to adjust the local position of the securing means of the ball on the variator in the axial and/or radial directions. The securing means is preferably formed by a leaf spring with a hole or an indent as the ball rest. However, other spring elements which can be fixed in location are also possible. The rectilinear guide may advantageously have on one side, in a longitudinal direction, a resiliently mounted stop strip as one of the running surfaces for the ball. With the resiliently and adjustably mounted ball as transmission element it is also possible, in particular, to provide a plurality of guide and cam paths in the mount and to compensate for redundancy on account of production tolerances.

BRIEF DESCRIPTION OF THE DRAWINGS

Exemplary embodiments are described hereinbelow with reference to the figures and are illustrated schematically in the drawing, in which:

FIG. 1 shows a cylindrical mount in longitudinal section,

FIG. 2 shows a cross section of the mount,

FIG. 3 shows the rectilinear guide in plan view,

DESCRIPTION OF THE PREFERED EMBODIMENTS

Figure 4:
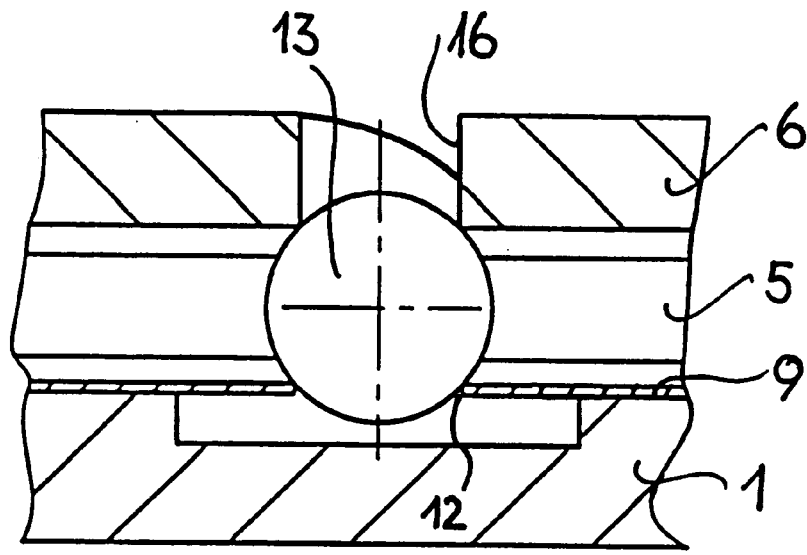
FIG. 4 shows another embodiment of the transmission element

In FIG. 1, a lens 2 is retained in the cylindrical sleeve of a variator 1. Said lens is intended to be displaceable along the cylinder axis 3, which is also the optical axis of an objective (not illustrated specifically). The variator 1 is mounted with sliding action, with a cylindrical fit, in a fixed cylindrical sleeve 4. The sleeve 4 contains a slot-like milled relief, running parallel to the cylindrical axis 3, as rectilinear guide 5. A cam carrier 6 is mounted rotatably on the sleeve 4. A retaining ring 7 prevents axial displacement of the cam carrier 6, which serves as focussing adjustment. Made in the inner wall of the cam carrier 6 is a trapezoidal thread 8, of which the pitch determines the travel of the variator 1 in the axial direction.

A leaf spring 9 is fastened on the variator 1 by two screws 10/11. A ball 13 is positioned in a hole-like opening 12 in the leaf spring 9. Instead of a hole-like opening, it is also possible to provide an indent made by deep drawing or thermoforming. A sufficient region beneath the ball rest is milled out as spring-excursion path. The center point of the ball is located within the rectilinear guide 5, i.e. the width of the slot-like milled relief is slightly greater than the ball diameter. Moreover, the ball 13 is located in the trapezoidal thread 8 of the cam carrier 6. The screws 10/11 can be actuated through two bores 14/15 in the cam carrier 6. In order to achieve optimum alignment between the ball rest in the leaf spring 9 and the trapezoidal thread 8, following release of the screws 10/11, the leaf spring 9 can be displaced axially in slots and fixed again in a no-backlash position. Moreover, a slight correction in the position of the variator in relation to the optical axis is possible if a plurality of such guides are provided in the cross section of the mount.

The stressing of the leaf spring 9, on the one hand, ensures that the ball 13 always butts in optimum fashion against the flanks of the trapezoidal thread. The diameter of the ball 13 may thus be selected separately in accordance with the width of the rectilinear guide 5. On the other hand, on the opposite side, the variator 1 is forced against the wall of the sleeve 4, with the result that any possible tilting is immediately counteracted. In particular with just one transmission element, the position of the ball 13 is expediently selected such that the pressure acts in the radial direction on the mass center of the variator. During a rotation of the cam carrier 6, the ball 13 moves to the left or right in the rectilinear guide 5. Since the ball 13 comes into contact with the wall of the rectilinear guide 5 only on its circumferential circle, the frictional forces are extremely low. The stressing of the leaf spring 9 and the spring-excursion path bounded by the milled relief in the variator 1 ensure that, during movement in the rectilinear guide 5, the ball 13 cannot be forced out of its hole-like rest. The variator 1 is thus carried along by the ball 13, it being possible for the ball 13 to rotate in its hole-like rest with a low level of friction.

FIG. 2 shows a section along the line A—A in FIG. 1. It can be seen therefrom that expediently three transmission elements with balls 13, 13', 13" are offset through in each case 120° in relation to one another. For this purpose, the trapezoidal thread 8 has three starts. It is particularly advantageous here for the ball rest to be adjustable to the respective trapezoidal thread in the axial direction. Jamming and tilting of the variator 1 in the sleeve 4 are ruled out in practice. The forces of the leaf springs are directed counter to one another and thus cancel one another out.

FIG. 3 shows, in the plan view along line B—B in FIG. 1, that the rectilinear guide 5 corresponds, in terms of width, to the diameter of the ball 13.

FIG. 4 shows an embodiment in which a guide cam 16 is milled in the cam carrier 6. This also makes it possible to realize complicated movement sequences for the variator 1. The disadvantage is that the ball 13 runs on the edges of the cam 16, with the result that said edges have to be milled or chamfered particularly cleanly, but this is extremely difficult in production terms. Any impact on the cam carrier may cause indents in the ball rest of the guide cam 16. Customary, use-related wear of the edges, however, is compensated for by the spring pressure, with the result that the zero backlash is maintained in each case.

Figure 5:
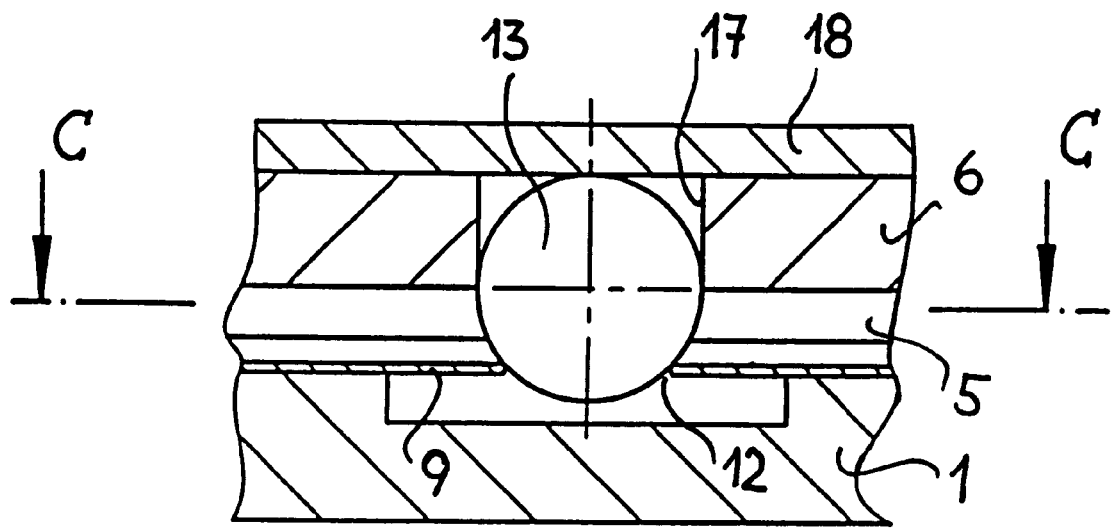
FIG. 5 shows a further embodiment of the transmission element.

In the embodiment illustrated in FIG. 5, the entire ball 13 runs in the guide path 17 in the cam carrier 6. A sleeve 18 prevents the ball 13 from dropping out. The disadvantages presented in the case of the embodiment according to FIG. 4 are thus avoided. However, in this embodiment, the width of the guide path 17 and of the rectilinear guide 5 both have to be equal to the diameter of the ball 13 in order to avoid backlash between the transmission elements. This means that the production has to meet more stringent requirements since the two guide cams are produced separately.

Figure 6:
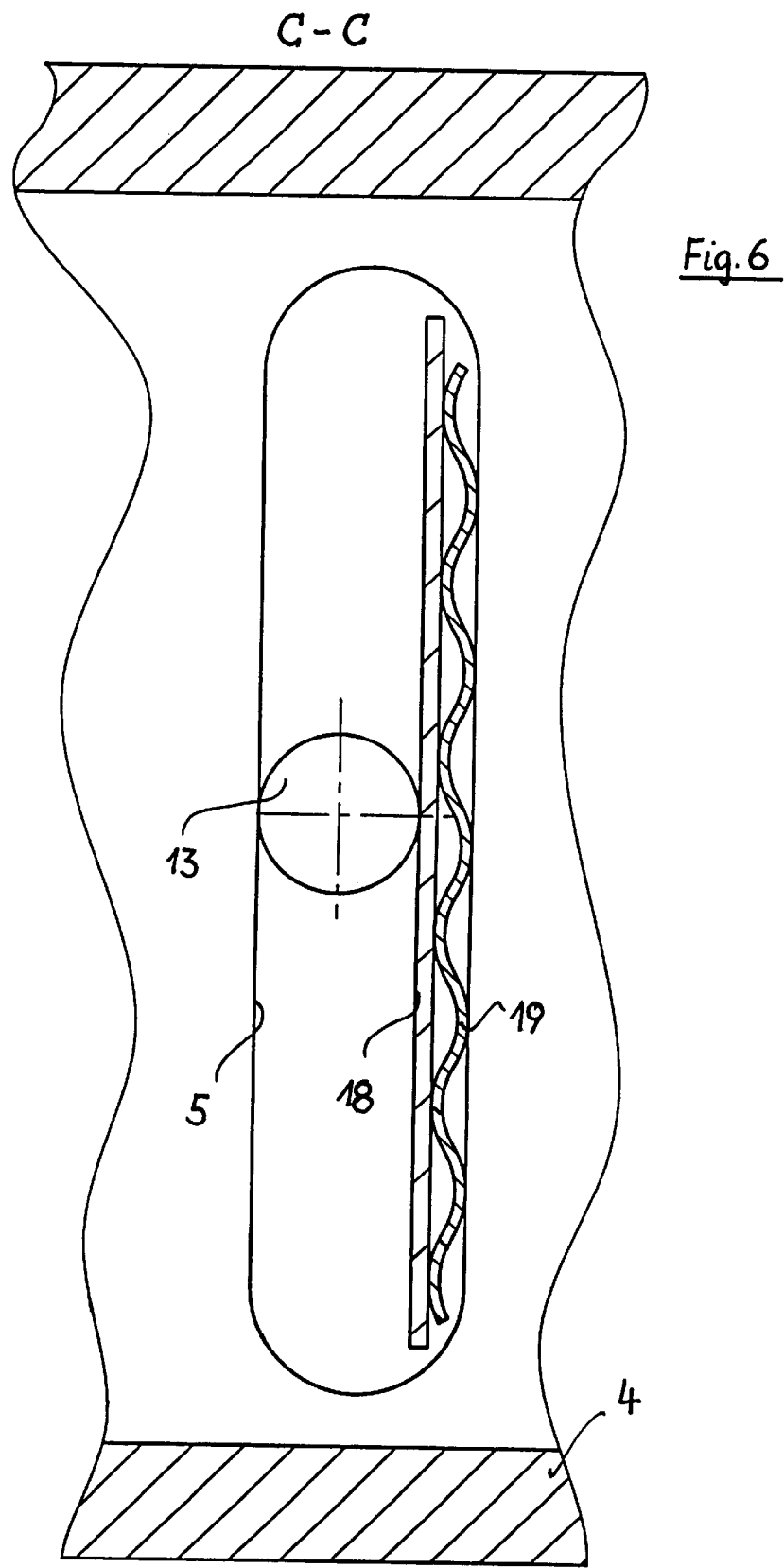
FIG. 6 shows a rectilinear guide with a resilient stop strip in plan view.

FIG. 6 shows a possible way of reducing the abovementioned requirements which have to be met by the production accuracy. The rectilinear guide 5 is designed to be wider than the diameter of the ball 13. The greater width is filled by a stop strip 18 and a corrugated spring 19 or other pressure-exerting means with suitable prestressing. The rectilinear guide 5 is thus adapted to the diameter of the ball 13 with zero backlash. In the case of a predetermined guide path 17, the ball 13 may thus be selected to fit the latter in optimum fashion, without the width of the rectilinear guide having to be taken into consideration. This is of particular advantage, in particular, in the production of complicated guide paths, e.g. for axially oscillating movements of the variator 1.

Figure 7:
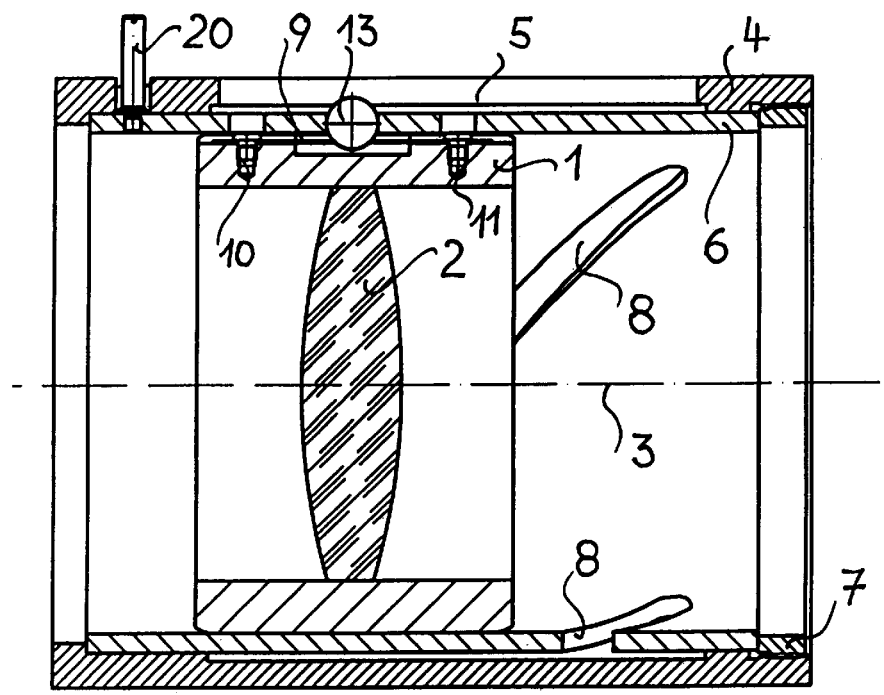
FIG. 7 shows an embodiment with the rectilinear guide located on the outside, in cross section.
Figure 8:
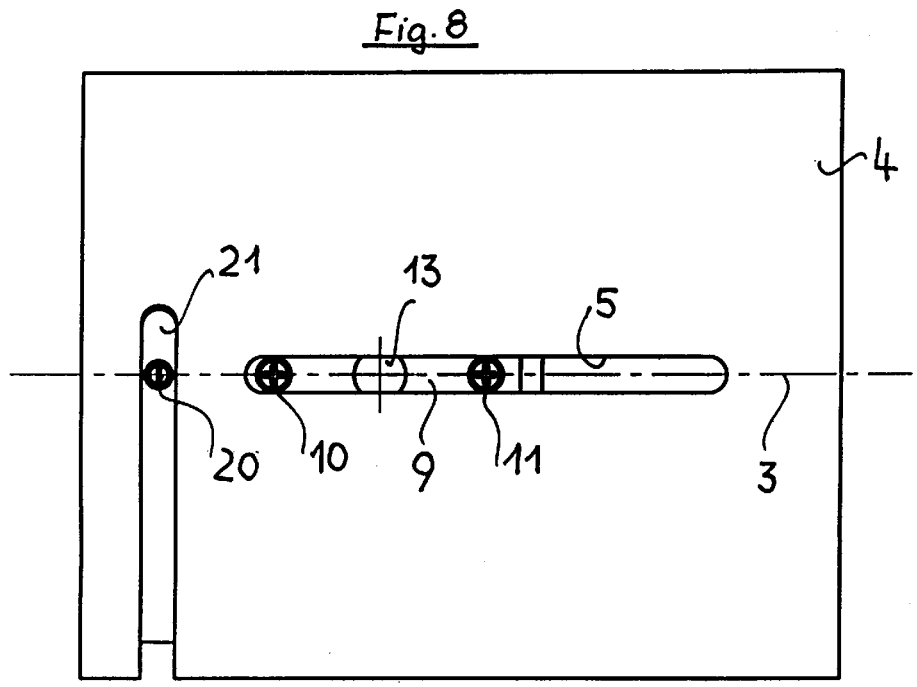
FIG. 8 shows a plan view of the rectilinear guide.

In the exemplary embodiments which have been described hitherto, use has been made of a rotatable outer cam carrier 6 which interacts with an inner rectilinear guide 5. However, it is also possible for the rectilinear guide 5 to be arranged in an outer mount cylinder and for the rotatable cam carrier 6 to be introduced between the rectilinear guide 5 and the variator 1. Such an arrangement is illustrated in FIGS. 7 and 8. In order to rotate the cam carrier 6, use is made of a pin 20 which is fastened thereon and is guided in a slot 21, running perpendicularly to the optical axis 3, in the sleeve 4. The ball 13 runs on the edges of the rectilinear guide 5, with the result that the disadvantages specified in relation to FIG. 4 have to be taken into account here. However, this can easily be remedied by slight chamfering of the edges, which are rectilinear here.

What is claimed is:

1. A cylindrical mount for adjustable optical components (2), having a sleeve (4) which is fixed relative to the mount and has a slot-like rectilinear guide (5), having an inner variator (1) which can be displaced axially in a cylindrical guide, having a rotatable cam carrier (6), and having at least one ball (13) as transmission element between the variator (1), rectilinear guide (5) and cam carrier (6), the ball (13) being retained on the variator (1) in a radially resilient manner in a locally fixable securing means (9, 12).

2. The cylindrical mount as claimed in claim 1, wherein it is possible to adjust the local position of the securing means (9, 12) on the variator (1) in the axial and/or radial directions.

3. The cylindrical mount as claimed in claim 1, wherein the securing means provided is a leaf spring (9) with a hole (12) or indent as the ball rest.

4. The cylindrical mount as claimed in claim 1, wherein the rectilinear guide (5) has on one side, in a longitudinal direction, a resiliently mounted stop strip (18) as one of the running surfaces for the ball (13).

* * * * *